United States Patent [19]
Stieler et al.

[11] Patent Number: 5,476,533
[45] Date of Patent: Dec. 19, 1995

[54] PROCESS FOR SINTERING IRON OXIDE-CONTAINING MATERIALS ON A SINTERING MACHINE

[75] Inventors: Fred Stieler, Heusenstamm; Norbert Magedanz, Hasselroth; Walter Gerlach, Frankfurt am Main; Jürgen Otto; Martin Hirsch, both of Friedrichsdorf; Fred Cappel, Dreieich; Detlev Schlebusch, Wöllstadt; Hermann Schmidt, Bad Nauheim; Heiko Weisel, Staufenberg; Hans-Joachim Werz, Frankfurt am Main, all of Germany

[73] Assignee: Metallgesellschaft Aktiengesellschaft, Frankfurt am Main, Germany

[21] Appl. No.: 955,483

[22] Filed: Oct. 2, 1992

[30] Foreign Application Priority Data

Oct. 3, 1991 [DE] Germany ............ 41 32 877.9
Jan. 25, 1992 [DE] Germany ............ 42 02 054.9
Jun. 13, 1992 [DE] Germany ............ 42 19 491.1

[51] Int. Cl.⁶ .................................. C22B 1/16
[52] U.S. Cl. ................. 75/758; 266/176; 266/156
[58] Field of Search ............ 266/176, 44, 177, 266/156; 75/758, 761, 763, 765

[56] References Cited

U.S. PATENT DOCUMENTS 2,672,412  3/1954  Burrow et al. ............ 266/176

FOREIGN PATENT DOCUMENTS

| | | |
|---|---|---|
| 2752877 | 11/1977 | Australia. |
| 1201558 | 9/1965 | Germany. |
| 2000132 | 1/1971 | Germany. |
| 2434722 | 2/1976 | Germany. |
| 2841629 | 4/1979 | Germany. |
| 52-116702 | 9/1977 | Japan. |
| 52-116703 | 9/1977 | Japan. |
| 54-061004 | 5/1979 | Japan. |

OTHER PUBLICATIONS

European Search Report EP 92 20 2867, Dec. 3, 1992.

*Primary Examiner*—Scott Kastler
*Attorney, Agent, or Firm*—Felfe & Lynch

[57] ABSTRACT

A sinterable mixture comprising iron-containing materials and solid fuel is sintered on a sintering machine; to decrease the rate at which exhaust gas is to be removed and to produce a desirable sinter, a part of the exhaust gas is enriched to an oxygen content of up to 24% by the addition of higher-oxygen gases and is then recirculated as a recycle gas, and exhaust gas is removed as a tail gas from the process only at a rate which corresponds to the rate of the gas which is formed during the sintering process plus the rate of the gas added for enriching plus the rate of inleaked air which has infiltrated from the outside minus the rate of oxygen consumption.

52 Claims, 1 Drawing Sheet

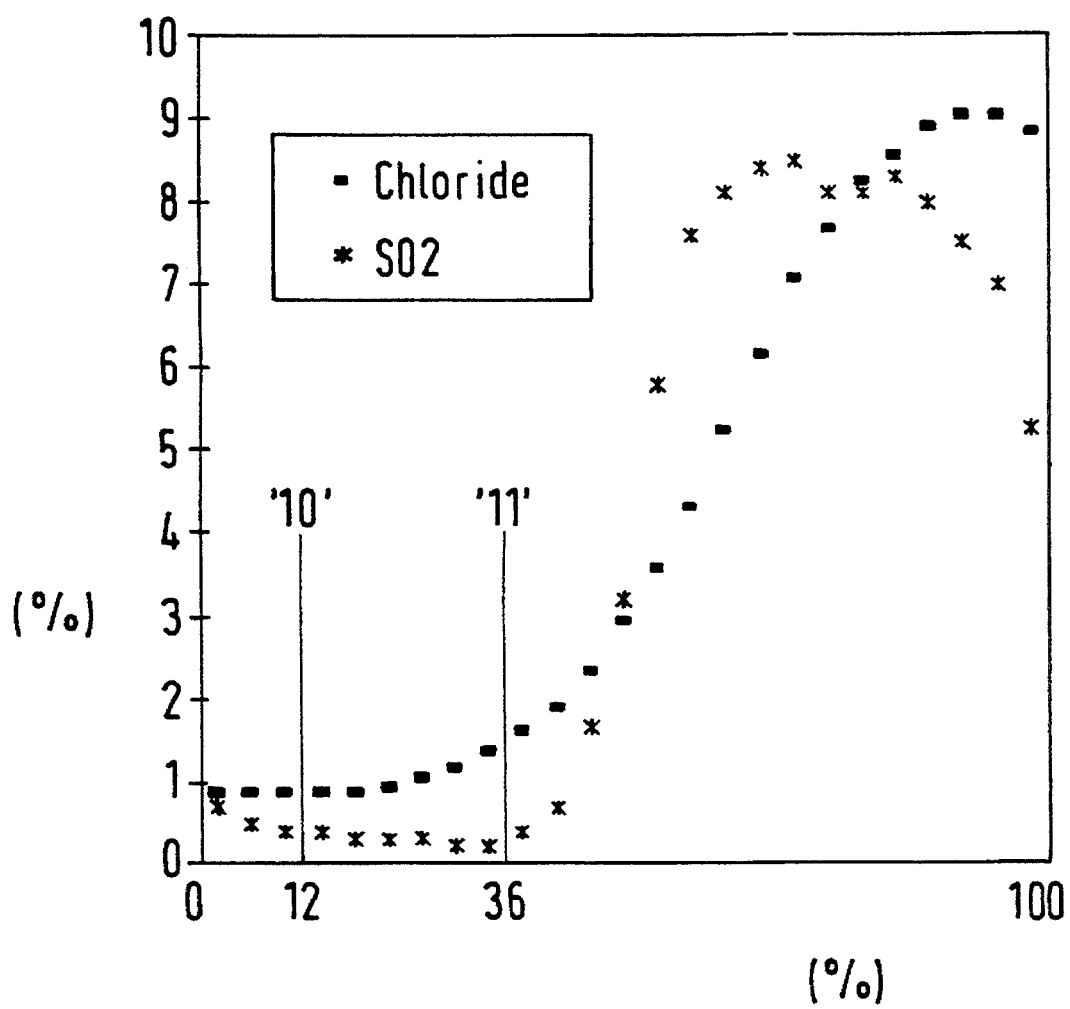

5,476,533

PROCESS FOR SINTERING IRON OXIDE-CONTAINING MATERIALS ON A SINTERING MACHINE

FIELD OF THE INVENTION

The invention relates to a process of sintering iron oxide-containing materials on a sintering machine, wherein a sinterable mixture which contains solid fuel is charged onto the sintering machine; the sinterable mixture is ignited on its surface; oxygen-containing gases are passed through the sinterable mixture and a portion of the exhaust gas is enriched by the addition of a higher-oxygen gas, and is then recirculated as oxygen-containing recycle gas; and the remaining portion of the exhaust gas is discharged as tail gas.

BACKGROUND OF THE INVENTION

It is well known that materials which contain iron oxides, particularly iron ores or iron ore concentrates, are sinterable on sintering machines. During a typical sintering process, the sinterable mixture consisting of the iron ore, recycled material, solid fuel, and fluxes is charged to the sintering machine and the fuel is then ignited on the surface of a charge bed of the machine under an igniting furnace. Thereafter, air is sucked through the bed being sintered and the sintering front proceeds from top to bottom through the bed being sintered. The exhaust gas is sucked into a gas-collecting line from wind boxes disposed under the upper course of the sintering machine, and after being purified is discharged into the atmosphere. In such a sintering process, heat must be transferred from the hot combustion gas to the cold solids. The rates of solids and air are thermally equivalent. The heat exchange requires high air rates and exhaust gas rates. Atmospheric oxygen is consumed only in part. Further, the exhaust gas contains water which has evaporated from the sinterable mixture, in addition to $CO_2$ produced by the combustion of the fuel and by calcining processes; sulfur oxides produced by the combustion of sulfur, mainly from the added coke or coal; CO produced by an incomplete combustion; and various other gaseous products and infiltrated air, such as air which has flowed into the exhaust gas between the side walls of the pallets and the charge, and has not been utilized.

Dust is also entrained by the exhaust gas. The exhaust gas rate is about 1000 $sm^3$ ($sm^3$=standard cubic meter) per 1000 kg of sinterable mixture or about 1,000,000 $sm^3/h$ for a sintering machine of 400 $m^3$.

The sintering process is effected in thin horizontal layers of the charge by the air which is being sucked through the charge, and together with the combustion front proceeds through the charge from top to bottom. The resulting sinter consists of a highly porous material. If the configuration of the sinter is to be preserved, the sintering process must not be changed, as would be the case, e.g., if more than superficial fusion occurred. For this reason a high volume rate of the exhaust gas is one of the requirements for this sintering process.

The exhaust gas rate can be decreased to some extent by a decrease of the rate of unused infiltrated air.

It has also been proposed to recycle the hot exhaust gas from the last suction boxes to the preceding portion of the sintering machine. In this case the exhaust gas rate can be decreased by up to about 40%. See "Stahl und Eisen" 99 (1979), No.7, pages 327–333 and AIME, Iron Making Conference proceedings, Vol. 38, Detroit, Mich., 1979, pages 104–111.

JP-A-52 116 703 discloses a sintering process in which no exhaust gas is discharged into the atmosphere. In this process the oxygen content of the sintering gas is increased by an addition of oxygen before the gas enters the charge bed and all or part of the exhaust gas is fed to a blast furnace. If all of the exhaust gas is fed to the blast furnace, the gas before entering the charge bed must contain more than 30% oxygen and the rate at which the gas is sucked may be as high as 650 $sm^3$ per 1000 kg sinter, and will decrease as the oxygen content is increased. If only a partial stream of the exhaust gas is fed to the blast furnace and the reminder is recirculated as a sintering exhaust gas, the rate at which gas is sucked also must not exceed 650 $sm^3$ per 1000 kg sinter, and will optimally amount to 500 $sm^3$ per 1000 kg if the gas contains 17% oxygen. The rate at which gas may be sucked will further decrease as the oxygen content is increased. However, the sintered product obtained by the use of gas at such a permissible rate is poor. Additionally, difficulties are involved due to the connection with the blast furnace on the gas side, and the oxygen consumption is extremely high.

It is therefore an object of the present invention to minimize the rate at which exhaust gas is to be removed in a process of sintering iron oxide-containing materials, and to achieve such a result in an economical process, which also results in a sintered product of high quality.

Further objects of this invention will be readily apparent to those persons generally skilled in the relevant art.

SUMMARY OF THE INVENTION

The aforesaid objects are accomplished in accordance with the present invention in that the tail gas consisting of exhaust gas is removed from the sintering process at a rate which corresponds to the rate at which gas is produced by the process, plus the rate at which higher-oxygen gas is added for enriching, plus the rate at which air has infiltrated from outside the process, minus the rate at which oxygen is consumed, and the remaining partial stream of the exhaust gas is recirculated as recycle gas, and before being applied to the sinterable mixture is enriched to contain up to 24% oxygen by the addition of higher-oxygen gases.

This invention will be more fully understood by the following detailed discussion.

DETAILED DISCUSSION

The term "higher-oxygen gases" as used herein are gases which contain an oxygen content which is higher than the oxygen content of the exhaust gas. The higher-oxygen gases may consist of air, oxygen-enriched air or technical oxygen. The gas produced by the sintering process in accordance with this invention consists mainly of $CO_2$ and CO, which are formed by the combustion of carbon; of water vapor formed by the evaporation of water contained in the charge; and of $SO_x$, which is formed from the sulfur contained in the charge. Inleaked air is infiltrated particularly at the feed and discharging ends of the sintering conveyor. Such inleaked air may also infiltrate at the sliding seals between the pallets and sealing strips. Part of the oxygen is consumed by the oxidation processes which are involved in the sintering process. Gas is removed from the entire exhaust gas only at the rate which corresponds to the volume rates at which gas has been produced by the processes mentioned above. The reminder of the exhaust gas is recirculated as recycle gas. The gas which consists of the recirculated recycle gas plus the admixed higher-oxygen gas is sucked into the charge at a rate of about 950 to 1200 $sm^3$ per 1000 kg sintered product.

The amount of $O_2$ in the mixed gas is about 30 to 130 $sm^3$ per 1000 kg sintered product. The rate at which the tail gas has to be removed from the process and the rate at which the higher-oxygen gas has to be admixed increases with a decreasing oxygen content of the higher-oxygen gas. The rate at which the tail gas has to be removed is the lowest if technical oxygen is used as higher-oxygen gas and is the highest if air is used because air introduces the highest rate of nitrogen and because the rate of nitrogen which is introduced into the recycle gas by the higher-oxygen gas has to be removed. The lower limit for the oxygen content in the sintering gas, i.e. the enriched gas which flows into the charge on the sintering machine, is about 8%. The rate at which tail gas is removed will depend on the mode of operation and may amount to as much as 600 $sm^3$ per 1000 kg of sintered product. That rate will be lower if commercially pure oxygen is used and the infiltration of inleaked air is decreased or avoided and if water vapor is condensed and $CO_2$ is scrubbed off. The upper course of the sintering machine is covered by a gas hood, to which the recycle gas is supplied. Recycle gas may also be fed to the igniting furnace.

To start the process in accordance with this invention, air is initially used as combustion air for the igniting furnace and as a sintering gas; exhaust gas at a rate determined as stated hereinbefore is removed as tail gas, and the remaining exhaust gas is recirculated as recycle gas.

The advantages afforded by this invention are that the rate at which exhaust gas must be removed is considerably decreased so that the exhaust gas can be purified at much lower cost and with improved results, whereby a sintered product having desirable properties is nevertheless obtained.

According to a preferred feature of this invention, the recycle gas is enriched to have an oxygen content of 16 to 22%. Within this range, it has been found that good operating conditions will be obtained and the sintering rate will be increased over the usual sintering rate which will be obtained if the sintering air is not enriched with oxygen. More preferably, the recycle gas is enriched to have an oxygen content of 18 to 21%. Within this range, particularly desirable operating conditions are obtained and the sintering rate will be higher than usual. Still more preferably, the recycle gas is enriched to have an oxygen content of 10 to 16%. Within this range, desirable operating conditions will be obtained and the sintering rate will correspond to the usual sintering rate, whereby the oxygen consumption will be decreased because less oxygen is removed in the tail gas.

In accordance with another preferred feature of this invention, a constant pressure close to the atmospheric pressure is adjusted in the gas hood which receives the recirculated recycle gas and this pressure is maintained constant by an automatic control of the rate at which tail gas is removed. The expression "close to the atmospheric pressure" as used herein means a pressure between a slightly subatmospheric pressure and a slightly superatmospheric pressure. In this case an infiltration of air which would not be used will be prevented or minimized and the rate at which tail gas is removed will always be in accordance with the criteria set forth hereinabove.

In another preferred feature of this invention, the rate at which solid fuel is supplied to the sinterable mixture is decreased to a degree which corresponds to the gross heating value of the CO which is recirculated in the recycle gas. Whereas the recycle gas contains oxygen in a large surplus relative to the carbon contained in the sinterable mixture, the exhaust gas may contain up to several percent CO. The rate at which the usually employed coke is supplied to the sinterable mixture is decreased to a degree which corresponds to the heating value of the CO contained in the exhaust gas. As much as 20% of the coke can thus be saved. As a result, the $SO_x$ content of the exhaust gas will be decreased correspondingly because sulfur is mainly introduced with the coke.

In accordance with another preferred feature of this invention, the rate at which tail gas is to be removed is decreased further in that $H_2O$ is condensed and/or $CO_2$ is scrubbed off and/or sulfur is bound by calcium which has been added. The condensation of water and the scrubbing to remove $CO_2$ are effected in the exhaust gas. Sulfur is bound by CaO or $Ca(OH)_2$ which has been added to the sinterable mixture or to the charge bed. In this manner, the rate at which tail gas is to be removed is decreased.

In another preferred feature, the recycle gas is heated to prevent a temperature drop below the dew point temperature of $H_2SO_4$. In this case a temperature drop below the dew point temperature of $H_2SO_4$ and the occurrence of corrosion will reliably be prevented even when the temperature of the gas is close to the aforesaid dew point temperature.

In another preferred feature, if $H_2O$ is to be condensed from the exhaust gas the dew point temperature of the gas is initially increased by an injection of water and the condensation is then effected by an indirect cooling.

In another preferred feature, the recycle gas before being recirculated is subjected to a coarse dedusting and the dust which has thus been collected is recycled to the sinterable mixture. The coarse dedusting is effected in mechanical dedusters, such as multistage or other cyclones. The dedusting may be effected jointly for the entire exhaust gas, for the recycle gas alone or separately for the recycle gas and the tail gas. In this case the wear of the gas lines will be decreased and the fine purification of the tail gas will be simplified.

Another preferred feature of this invention resides in that recycle gas is used as a barrier gas at the ends of the gas hood. Under the upper course, barrier gas wind boxes are provided under the gas hood at the receiving and the discharge ends of the sintering machine and cause a slightly superatmospheric pressure to be maintained in the gas hood over the charge bed. As a result, recycle gas at a low rate flows as a barrier gas through the gap between the surface of the charge bed and the bottom edge of the end wall of the gas hood and an infiltration of inleaked air at the ends is thus prevented.

Another preferred feature resides in that for the removal of gaseous pollutants and solids, exhaust gas is treated in a circulating fluidized bed with solid sorbents at temperatures under 150° C., preferably at 60° C. to 80° C. The sorbents which are employed consist mainly of CaO, $Ca(OH)_2$, $CaCO_3$ and dolomite. The system of the circulating fluidized bed consists of a fluidized bed reactor, a separator for separating solids from the suspension which has been discharged from the fluidized bed reactor, which separator usually consists of a recycling cyclone, and a recycle line for recycling collected solids to the fluidized bed reactor. Unless the exhaust gas becomes available at a suitable temperature, the temperature of the mixture consisting of the exhaust gas and the sorbent in the fluidized bed reactor is adjusted by supply of water to the fluidized bed reactor. The gas velocity in the fluidized bed reactor is adjusted to 1 to 10 m/sec., preferably 2 to 5 m/sec. The mean suspension density in the fluidized bed reactor amounts to 0.1 to 100 $kg/m^3$, preferably 1 to 5 $kg/m^3$. The mean particle size of the sorbent amounts to 1 to 100 um, preferably 5 to 20 um. The amount of sorbent which is circulated per hour is at least five times, and preferably thirty to one hundred times, the amount of sorbent contained in the shaft of the fluidized bed reactor the cooling taking place in the fluidized bed reactor causes the temperature of the mixture to be 5° to 30° C. above the dew point temperature of water. In accordance therewith, the water vapor partial pressure in the fluidized bed reactor is adjusted to correspond to 15 to 50% by volume water vapor, preferably to 25 to 40% by volume. The sorbent may be fed to the fluidized bed reactor as dry solids or as an aqueous suspension. If the added sorbent has a small particle size, the sorption in the fluidized bed reactor may be carried out in the simultaneous presence of a supporting bed of solids having a mean particle size of 100 to 500 um. From an "orthodox" fluidized bed, in which a dense phase is separated by a distinct density step from the overlaying gas space, a circulating fluidized bed differs by the presence of states of distribution without a defined boundary layer. There is no density step between a dense phase and a overlying dust space but the solids concentration in the reactor decreases continuously from bottom to top. A gas-solids suspension is discharged from the top part of the reactor. If the operating conditions are defined by the Froude and Archimedes numbers, the following ranges will be obtained:

$$0.1 \leq 3/4 \times Fr^2 \times \frac{\rho_o}{\rho_k - \rho_g} \leq 10$$

and $0.01 \leq Ar \leq 100$
wherein $$Ar = \frac{d_k^3 \times g(\rho_k - \rho_g)}{\rho_g \times v^2}$$

and $$Fr^2 = \frac{u^2}{g \times d_k}$$

and
u=relative gas velocity in m/sec.;
Ar=Archimedes number;
Fr=Froude number;
$\rho_g$=density of gas in kg/m$^3$;
$\rho_k$=density of solid particle in kg/m$^3$;
$d_k$=diameter of spherical particle in m;
v=kinematic viscosity in m$^2$/sec.; and
g=constant of gravitation in m/sec$^2$.

In the circulating fluidized bed the exhaust gas may be treated in such a manner that the entire exhaust gas, or only the recycle gas or the tail gas, is treated or the recycle gas and the tail gas are separately treated. The treatment in the circulating fluidized bed serves mainly to remove a large part of the $SO_x$ content and of the dust. The laden sorbent which is withdrawn from the circulating fluidized bed is recycled to the sinterable mixture. Whereas the sintering results in a partial volatilization, a major part of the sorbed pollutants will be bound in the sinter and will thus be removed from the circulation. By the sorption in the circulating fluidized bed, enriching of $SO_x$ in the recycle gas will be avoided and a substantial removal of $SO_x$ from the tail gas will be effected in a relatively simple and reliable manner. Additionally, dust will be removed to a substantial degree. When desired, the tail gas may be subjected to a fine dedusting, e.g., in a gas-purifying electrostatic precipitator.

In another preferred feature of this invention, the tail gas is withdrawn from wind boxes which are disposed under the sintering conveyor near its feed end. It has been found that loading of the exhaust gas with various pollutants near the feed end of the sintering conveyor is much lower than loading of the exhaust gas sucked from the succeeding portion of the sintering conveyor, because near the feed end of the sintering conveyor at least the lower layers of the charge are still moist, and as a result will very strongly retain pollutants by adsorption, absorption, and filtration. Only as the sintering process proceeds, the pollutants accumulated in the charge are driven into the recycle gas with a high concentration, and together with the recycle gas are returned onto the charge. Such pollutants may include gases, such as $SO_2$, $SO_3$, HCl, and HF, and vapors such as non-ferrous metals and non-ferrous metal compounds, and dusts such as chlorides and fluorides. In tail gas withdrawn from the sintering conveyor near its feed end, the content of the gaseous pollutants relative to the total content of such pollutants in the entire exhaust gas from the sintering conveyor decreases in the above sequence. Any dioxines or furans contained in the exhaust gas may be expected to be contained only in very small amounts also in the exhaust gas from the sintering conveyor near its feed end and substantially to enter the recycle gas and to be returned with the latter onto the charge and to be destroyed as such pollutants pass through the combustion front of the charge. This means that the tail gas withdrawn from the sintering conveyor near its feed end consists of a gas which can be withdrawn from the process and which can directly be released into the atmosphere after that gas has been dedusted or can be treated in a relatively simple manner to remove pollutants. The number of wind boxes and the length of the portion of the sintering conveyor from which the tail gas is withdrawn is so selected that tail gas will be available therein at the rate at which said gas is to be removed. Tail gas at such a rate usually becomes available on a length corresponding to 10 to 50% of the total length of the sintering conveyor. The dust content of the tail gas from the aforesaid first wind boxes consists almost entirely of coarse dust and can be separated by means of cyclones or multiclones. In the sintering process, fine dust is mainly formed by the sublimation of gaseous chlorides which emerge from the combustion zone of the sinterable mixture and particularly consist of alkali chlorides. Near the feed end of the sintering conveyor, this fine dust is substantially removed from the gas by the filtering action of the still moist lower layers of the charge and is thus bound in the charge. As the recycle gas undergoes recycling its dust content is substantially removed from the gas in the bed being sintered or is deposited on the large surface areas of the porous sintered structure and is thus removed from circulation. For this reason it will be very simple to dedust the recycle gas. To prevent an enriching of $SO_2$ in the recycle gas, $SO_2$ must be removed therefrom. This can be effected in that calcium-containing substances, such as Ca(OH)$_2$ or CaO, are added to the charge, or in that $SO_2$ is removed from the recycle gas outside the charge.

According to another preferred feature of this invention, a solution which contains hydroxides and/or oxides of calcium and/or of magnesium is sprayed onto the surface of the charge on the sintering conveyor in a portion thereof which has a considerable length and to which recycle gas is returned. Solutions which contain Ca(OH)$_2$ are particularly suitable. $SO_2$ is bound in the charge. The length of the charge portion over which the sulfur-binding substances are sprayed onto the charge and the amount of the sulfur-binding substances will depend on the process conditions employed in any given case and can empirically be determined. The sulfur-binding substances employed may consist of waste materials, which are thus disposed of. This feature permits $SO_2$ to be removed from the recycle gas in a simple and economical manner.

According to another preferred feature of this invention, the sintering conveyor is provided with a grate-covering layer, which is moistened with a solution of the hydroxides and/or oxides of calcium and/or of magnesium. This will also permit $SO_2$ to be removed from the recycle gas in a simple and economical manner.

According to another preferred feature of this invention, the tail gas is reheated. In particular, tail gas withdrawn from the sintering machine near its feed end has a relatively low temperature of about 50° to 80° C. To avoid corrosion in the succeeding fans, the tail gas is reheated to a temperature which is sufficiently high to prevent a subsequent condensation.

According to another preferred feature of this invention, the exhaust gas from the first wind box or from the first portion of the wind box which contains inleaked air which enters the sintering conveyor from the front end is fed into the recycle gas and the tail gas is withdrawn from succeeding wind boxes. As a result, the inleaked air is not immediately removed together with the tail gas but is used to increase the oxygen content of the recycle gas. This mode of operation will be desireable if the recycle gas is enriched with oxygen by an addition of air or of slightly oxygen-enriched air.

According to another preferred feature of this invention, the tail gas is withdrawn from the sintering conveyor through wind boxes in which the exhaust gas contains pollutants in high concentrations and said pollutants are removed from the tail gas. The resulting tail gas contains a major amount of the pollutants which become available during the sintering process, and the pollutants to be removed are contained in a very small volume of gas. It is thus possible to selectively remove, e.g. non-ferrous metals, particularly zinc and lead, and/or compounds thereof, from the exhaust gas. This will be particularly desirable if the sinterable mixture contains metallurgical residual materials, such as converter dusts or dusts from the sintering plant, because such residual materials have a relatively high content of non-ferrous metals.

According to yet another preferred feature of this invention, a partial stream of the recycle gas is withdrawn from the sintering conveyor through wind boxes in which the exhaust gas contains pollutants in high concentrations. The pollutants are removed from said partial stream, and said partial stream is subsequently returned into the recycle gas. In this manner the pollutants to be removed are also contained in a relatively small volume of exhaust gas.

This invention will now be explained in more detail with reference to the following examples including examples of preferred embodiments of this invention. It is to be understood, however, that these examples are for illustrative purposes only and are not intended to limit the scope of this invention or the claims or the spirit thereof in any way.

The following examples relate to a sintering machine of 400 m², which is operated with the following operating parameters:

| | |
|---|---|
| Output of sintered product | 578.300 kg/h |
| Oxygen consumption | 56.9 sm³/1000 kg sinter |
| Formation of water vapor | 99.7 sm³/1000 kg sinter |
| Formation of $CO_2$ | 79.3 sm³/1000 kg sinter |
| CO content of exhaust gas | 1% |

In the following results summarized in Table I, Example 0 is a conventional sintering process carried out with air, and Examples 1 to 6 relate to the sintering in accordance with the invention.

For Examples 1 and 3 the results are indicated which are obtained with different $O_2$ contents in the sintering gas (enriched recycle gas).

In Example 4 the results are indicated which are obtained when less inleaked air is permitted to infiltrate than in Example 2.

In Example 5 results are obtained when water vapor is condensed, and $CO_2$ is scrubbed from the exhaust gas as compared with the results obtained in Example 4.

Example 6 shows the results obtained with an added higher-oxygen gas which has a lower $O_2$ content than that used in Example 2.

TABLE I

| | Example No. | | | | | | |
|---|---|---|---|---|---|---|---|
| Processing | 0 Conventional | 1 | 2 | 3 | 4 | 5 | 6 |
| | | In accordance with the invention | | | | | |
| Rate of gas sucked (sm³/1000 kg sinter) | 1204.8 | 1069.6 | 1069.6 | 1069.6 | 1069.6 | 1069.6 | 1069.6 |
| $O_2$ content of sintering gas (%) | 21.0 | 15.0 | 18.0 | 21.0 | 18.0 | 18.0 | 18.0 |
| inleaked unusable air (sm³/1000 kg sinter) | 197.0 | 98.5 | 98.5 | 98.5 | 39.4 | 39.4 | 98.5 |
| (% of original rate) | 100.0 | 50.0 | 50.0 | 50.0 | 20.0 | 20.0 | 50.0 |
| $O_2$ content of added gas (%) | — | 99.9 | 99.9 | 99.9 | 99.9 | 99.9 | 80.0 |
| Condensation of $H_2O$ vapor and scrubbing of $CO_2$ | — | — | — | — | — | yes | — |
| Exhaust gas rate (sm³/1000 kg sinter) | 1524.2 | 1293.3 | 1293.4 | 1293.5 | 1233.8 | 1231.7 | 1293.6 |
| Rate of gas removal (sm³/1000 kg sinter) | 1524.2 | 287.7 | 296.0 | 304.7 | 241.3 | 37.1 | 317.5 |
| (percentage of original rate) | 100.0 | 18.9 | 19.4 | 20.0 | 15.8 | 2.4 | 20.8 |
| Recycle gas rate (sm³/1000 kg sinter) | — | 1005.6 | 997.4 | 988.8 | 992.5 | 1015.6 | 976.1 |

TABLE I-continued

| | Example No. | | | | | | |
|---|---|---|---|---|---|---|---|
| | 0 | 1 | 2 | 3 | 4 | 5 | 6 |
| Processing | Conventional | In accordance with the invention | | | | | |
| Composition of tail gas | | | | | | | |
| $N_2$ (%) | 72.5 | 26.6 | 25.9 | 25.2 | 12.8 | 83.3 | 30.0 |
| $O_2$ (%) | 15.5 | 9.6 | 12.1 | 14.5 | 11.7 | 13.7 | 12.1 |
| $H_2O$ (%) | 6.8 | 35.2 | 34.2 | 33.3 | 41.6 | 1.8 | 31.9 |
| $CO_2$ (%) | 4.2 | 27.6 | 26.8 | 26.0 | 32.9 | 0.0 | 25.0 |
| CO (%) | 1.0 | 1.0 | 1.0 | 1.0 | 1.0 | 1.2 | 1.0 |
| Rate of added gas ($sm^3$/1000 kg sinter) | — | 64.2 | 72.3 | 80.9 | 76.9 | 54.0 | 93.5 |
| Rate of $O_2$ ($sm^3$/1000 kg sinter) | — | 64.1 | 72.2 | 80.8 | 76.8 | 53.9 | 74.8 |
| CO loss ($sm^3$/1000 kg sinter) | 15.2 | 2.9 | 3.0 | 2.4 | 2.4 | 0.4 | 3.2 |

The results of examples 7 to 9 summarized in Table II below show the parameters for admixing air as high-oxygen gas. The rates of the gases are given in $sm^3$/1000 kg of produced sinter.

TABLE II

| | Example | | |
|---|---|---|---|
| | 7 | 8 | 9 |
| Rate of sintering gas | 1165 | 1165 | 1165 |
| $O_2$ content of sintering gas (%) | 12 | 14 | 16 |
| Rate of added air | 385.45 | 474.48 | 600 |
| Rate of exhaust gas | 1488.53 | 1489.4 | 1488.5 |
| Rate of gas removal | 610.51 | 700.12 | 825.03 |
| Gas removal in percentage of original rate | 40.14 | 46.03 | 54.24 |
| Composition of tail gas (%) | | | |
| $O_2$ | 7.55 | 9.19 | 10.86 |
| $H_2O$ | 16.38 | 14.14 | 12.0 |
| $CO_2$ | 12.82 | 11.07 | 9.4 |
| $N_2$ | 63.25 | 64.60 | 66.76 |
| CO | 1.0 | 1.0 | 1.0 |
| Composition of sintering gas (%) | | | |
| $CO_2$ | 8.6 | 6.65 | 4.6 |
| $H_2O$ | 11.0 | 8.5 | 5.8 |
| $N_2$ | 68.5 | 70.46 | 73.1 |
| CO | 0.7 | 0.6 | 0.5 |

The examples in Table II show the following dependencies:

1. With the oxygen content unchanged in the sintering gas,
   a) the rate of the tail gas is increased, with a decrease in the oxygen content in the added higher-oxygen gas; and
   b) the rate of added oxygen per 1000 kg of produced sinter is increased with an increase in the oxygen content of the added higher-oxygen gas.
2. The rate of tail gas unchanged,
   is accompanied by an increase in the rate of added oxygen per 1000 kg of produced sinter with increasing oxygen content in the added higher-oxygen gas, and with increasing oxygen content of the sintering gas.
3. The oxygen content in the added higher-oxygen gas unchanged,
   results in a decrease in the rate of the tail gas and the added rate of oxygen per 1000 kg of produced sinter with decreasing oxygen content in the sintering gas.
4. The rate of added oxygen unchanged,
   results in an increase in the rate of the tail gas with increasing oxygen content of the sintering gas and with decreasing oxygen content of the added higher-oxygen gas.

The following Examples 10 and 11 will be described with reference to Examples 3 and 7.

EXAMPLE 10

A tail gas was withdrawn at a rate of 304.7 $sm^3$ per 1000 kg of sinter. Gas at that rate is withdrawn from the sintering conveyor over 12% of the length thereof, calculated from the feed end of the portion over which gas is sucked. The tail gas contained 7.1% of the $SO_2$ contained in the entire exhaust gas and 2.6% of the chlorides contained in the entire exhaust gas.

EXAMPLE 11

Tail gas was withdrawn at a rate of 610,51 $sm^3$ per 1000 kg of sinter. Gas at that rate is withdrawn from the sintering conveyor over 36% of the length thereof, calculated from the feed end of the portion over which gas is sucked. The tail gas contained 14.2% of the $SO_2$ contained in the entire exhaust gas and 9.1% of the chlorides contained in the entire exhaust gas.

BRIEF DESCRIPTION OF THE DRAWING

The drawing illustrates the distribution of the mass flow rates of $SO_2$ and chlorides for a practical operation. Each value which is plotted indicates the measured percentage of the content of the pollutant in the associated wind box of the sintering machine in relation to the total amount of that pollutant (100%) in the entire exhaust gas.

We claim:

1. In a process of sintering iron oxide-containing materials on a sintering machine, wherein a sinterable mixture which contains solid fuel is charged onto the sintering machine; the sinterable mixture is ignited on its surface; oxygen-containing gases are passed through the sinterable mixture; part of the exhaust gas is enriched by an addition of a higher-oxygen gas and is then recirculated as oxygen-containing recycle gas; and the other part of the exhaust gas is discharged as tail gas, wherein the improvement is the tail gas which consists of exhaust gas is removed from the process at a rate which corresponds to the rate at which gas is produced by the sintering process, plus the rate at which higher-oxygen gas is added for enriching, plus the rate at which inleaked air has infiltrated from the outside, minus the rate at which oxygen is consumed, and the other partial stream of the exhaust gas is recirculated as recycle gas and before being applied to the sinterable mixture is enriched to contain up to 24% oxygen by the addition of higher-oxygen gases.

2. A process according to claim 1, wherein the recycle gas is enriched to have an oxygen content of from 16 to 22%.

3. A process according to claim 1, wherein a constant pressure close to the atmospheric pressure is adjusted in a gas hood which receives the recirculated recycle gas and said pressure is maintained constant by an automatic control of the rate at which tail gas is removed.

4. A process according to claim 1, wherein the rate at which solid fuel is supplied to the sinterable mixture is decreased to a degree which corresponds to the gross heating value of the CO which is recirculated in the recycle gas.

5. A process according to claim 1, wherein the rate at which tail gas is to be removed is decreased further in that a step is conducted selected from the group consisting of $H_2O$ is condensed, $CO_2$ is scrubbed off and sulfur is bound by calcium which has been added.

6. A process according to claim 1, wherein the recycle gas is heated to prevent a temperature drop below the dew point temperature of $H_2SO4$.

7. A process according to claim 5, wherein before $H_2O$ is condensed from the exhaust gas the dew point temperature of the gas is initially increased by an injection of water and the condensation is then effected by an indirect cooling.

8. A process according to claim 1, characterized in that the recycle gas before being recirculated is subjected to a coarse dedusting and the dust which has thus been collected is recycled to the sinterable mixture.

9. A process according to claim 1, wherein part of the recycle gas is used as a barrier gas at the ends of the gas hood.

10. A process according to claim 1 wherein for a removal of gaseous pollutants and solids the exhaust gas is treated in a circulating fluidized bed with solid sorbents at temperatures under 150°.

11. A process according to claim 1, wherein the tail gas is withdrawn from wind boxes which are disposed under a sintering machine near its feed end.

12. A process according to claim 11, wherein a solution which contains a compound selected from the group consisting of hydroxides, oxides of calcium and oxides of magnesium is sprayed onto the surface of the charge of the sintering conveyor in a portion thereof and to which recycle gas is returned.

13. A process according to claim 11, wherein the sintering conveyor is provided with a grate-covering layer, which is moistened with a solution of a compound selected from the group consisting of hydroxides, oxides of calcium and oxides of magnesium.

14. A process according to claim 11, wherein the tail gas is reheated.

15. A process according to claim 11, wherein the exhaust gas from a first wind box or from a first portion of a wind box which contains inleaked air which enters the sintering conveyor from the front end is fed into the recycle gas and the tail gas is withdrawn from succeeding wind boxes.

16. A process according to claim 1, wherein the tail gas is withdrawn from a sintering machine through wind boxes in which the exhaust gas contains pollutants in high concentrations and said pollutants are removed from the tail gas.

17. A process according to claim 1, wherein a partial stream of the recycle gas is withdrawn from a sintering machines through wind boxes in which the exhaust gas contains pollutants in high concentrations, the pollutants are removed from said partial stream and said partial stream is subsequently returned into the recycle gas.

18. The process of claim 10 wherein the exhaust gas is treated at temperatures between 80° C. and 60° C.

19. A process according to claim 1 wherein the recycle gas is enriched to have an oxygen content of from 18 to 21%.

20. A process according to claim 19, wherein a constant pressure close to the atmospheric pressure is adjusted in a gas hood which receives the recirculated recycle gas and said pressure is maintained constant by an automatic control of the rate at which tail gas is removed.

21. A process according to claim 19, wherein the rate at which solid fuel is supplied to the sinterable mixture is decreased to a degree which corresponds to the gross heating value of the CO which is recirculated in the recycle gas.

22. A process according to claim 19, wherein the rate at which tail gas is to be removed is decreased further in that a further step is conducted which selected from the group consisting of $H_2O$ is condensed $CO_2$ is scrubbed off and sulfur is bound by calcium which has been added.

23. A process according to claim 19, wherein the recycle gas is heated to prevent a temperature drop below the dew point temperature of $H_2SO4$.

24. A process according to claim 22, wherein before $H_2O$ is condensed from the exhaust gas the dew point temperature of the gas is initially increased by an injection of water and the condensation is then effected by an indirect cooling.

25. A process according to claim 19, characterized in that the recycle gas before being recirculated is subjected to a coarse dedusting and the dust which has thus been collected is recycled to the sinterable mixture.

26. A process according to claim 19, wherein part of the recycle gas is used as a barrier gas at the ends of the gas hood.

27. A process according to claim 19 wherein for a removal of gaseous pollutants and solids the exhaust gas is treated in a circulating fluidized bed with solid sorbents at temperatures under 150°.

28. A process according to claim 19, wherein the tail gas is withdrawn from wind boxes which are disposed under a sintering conveyor near its feed end.

29. A process according to claim 28, wherein a solution which contains a compound selected form the group consisting of hydroxides, oxides of calcium, and oxides of magnesium is sprayed onto the surface of the charge of the sintering conveyor in a portion thereof and to which recycle gas is refined.

30. A process according to claim 28, wherein the sintering conveyor is provided with a grate-covering layer, which is moistened with a solution of a compound selected from the group consisting of hydroxides, oxides of calcium and oxides of magnesium.

31. A process according to claim 27, wherein the tail gas is reheated.

32. A process according to claim 28, wherein the exhaust gas from a first wind box or from a first portion of a wind box which contains inleaked air which enters the sintering conveyor from the front end is fed into the recycle gas and the tail gas is withdrawn from succeeding wind boxes.

33. A process according to claim 19, wherein the tail gas is withdrawn from the sintering conveyor through wind boxes in which the exhaust gas contains pollutants in high concentrations and said pollutants are removed from the tail gas.

34. A process according to claim 19, wherein a partial stream of the recycle gas is withdrawn from the sintering conveyor through wind boxes in which the exhaust gas contains pollutants in high concentrations, the pollutants are removed from said partial stream and said partial stream is subsequently returned into the recycle gas.

35. A process according to claim 19, wherein for a removal of gaseous pollutants and solids the exhaust gas is treated in a circulating fluidized bed with solid sorbents at temperatures at 80° to 60° C.

36. A process accordingly to claim 1 wherein the recycle gas is enriched to have an oxygen content of from 10 to 16%.

37. A process according to claim 36, wherein a constant pressure close to the atmospheric pressure is adjusted in a gas hood which receives the recirculated recycle gas and said pressure is maintained constant by an automatic control of the rate at which tail gas is removed.

38. A process according to claim 36, wherein the rate at which solid fuel is supplied to the sinterable mixture is decreased to a degree which corresponds to the gross heating value of the CO which is recirculated in the recycle gas.

39. A process according to claim 36, wherein the rate at which tail gas is to be removed is decreased further in that a further step is conducted selected from the group consisting of $H_2O$ is condensed, $CO_2$ is scrubbed off, and sulfur is bound by calcium which has been added.

40. A process according to claim 36, wherein the recycle gas is heated to prevent a temperature drop below the dew point temperature of $H_2SO4$.

41. A process according to claim 39, wherein before $H_2O$ is condensed from the exhaust gas the dew point temperature of the gas is initially increased by an injection of water and the condensation is then effected by an indirect cooling.

42. A process according to claim 36, characterized in that the recycle gas before being recirculated is subjected to a coarse dedusting and the dust which has thus been collected is recycled to the sinterable mixture.

43. A process according to claim 36, wherein part of the recycle gas is used as a barrier gas at the ends of the gas hood.

44. A process according to claim 36 wherein for a removal of gaseous pollutants and solids the exhaust gas is treated in a circulating fluidized bed with solid sorbents at temperatures under 150°.

45. A process according to claim 36, wherein the tail gas is withdrawn from wind boxes which are disposed under a sintering conveyor near its feed end.

46. A process according to claim 45, wherein a solution which contains a compound selected form the group consisting of hydroxides, oxides of calcium and oxides of magnesium is sprayed onto the surface of the charge of the sintering conveyor in a portion thereof and to which recycle gas is returned.

47. A process according to claim 45, wherein the sintering conveyor is provided with a grate-covering layer, which is moistened with a solution of a compound selected from the group consisting of hydroxides, oxides of calcium and oxides of magnesium.

48. A process according to claim 45, wherein the tail gas is reheated.

49. A process according to claim 45, wherein the exhaust gas from a first wind box or from a first portion of a wind box which contains inleaked air which enters the sintering conveyor from the front end is fed into the recycle gas and the tail gas is withdrawn from succeeding wind boxes.

50. A process according to claim 36, wherein the tail gas is withdrawn from the sintering conveyor through wind boxes in which the exhaust gas contains pollutants in high concentrations and said pollutants are removed from the tail gas.

51. A process according to claim 36, wherein a partial stream of the recycle gas is withdrawn from the sintering conveyor through wind boxes in which the exhaust gas contains pollutants in high concentrations, the pollutants are removed from said partial stream and said partial stream is subsequently returned into the recycle gas.

52. A process according to claim 36, wherein for a removal of gaseous pollutants and solids the exhaust gas is treated in a circulating fluidized bed with solid sorbents at temperatures at 80° to 60° C.

* * * * *